Dec. 27, 1966  A. O. G. ERNST  3,294,323

JET DEFLECTOR DEVICE OPERATING BY LIQUID INJECTION

Filed July 2, 1964

Inventor
Adolphe O. G. Ernst
By Stevens Davis Miller & Mosher
Attorneys

United States Patent Office 3,294,323
Patented Dec. 27, 1966

3,294,323
JET DEFLECTOR DEVICE OPERATING
BY LIQUID INJECTION
Adolphe Otton Gontier Ernst, Bois-le-Roi, France, assignor to Societa Nationale d'Etude et de Construction de Moteurs d'Aviation
Filed July 2, 1964, Ser. No. 379,980
Claims priority, application France, July 11, 1963, 941,141
2 Claims. (Cl. 239—265.23)

This invention relates to the now well known technique of deflecting a jet issuing from a nozzle by injecting an auxiliary fluid under suitable pressure whereby to produce a control effect by reaction. The invention is more particularly applicable to the deflection of supersonic jets issuing from rocket nozzles, by means of dissymmetrical shock waves caused by the peripheral injection of a liquid which is vaporizable by the heat of the jet, said injection being made at low velocity in order that its effect on the jet boundary layer be more marked.

Heretofore there have been proposed jet deflection devices operating by liquid injection in accordance with the principle referred to above and utilizing two successive longitudinally spaced levels of injection into the nozzle, to wit, through upstream injecting means adapted to produce the desired shock wave, on the one hand, and, on the other hand, through downstream injecting means adapted to slow down the boundary layer in order that the influence of the liquid injected upstream may develop in full.

The present invention has for its object a jet deflection device of this kind, wherein the injection means at the upstream and downstream levels are fed with the same liquid from a common supply thereof, the downstream injection being effected at a relatively high pressure from a direct supply of pressure-liquid, while the shock wave generating upstream injection is effected at a relatively lower pressure obtained by creating a pressure drop.

Particularly satisfactory results were obtained by the inventor by utilizing, as the deflecting liquid, hydrogen peroxide or derivatives of the hydrocarbons containing chlorine and fluorine, generally designated as "Freon." However, recourse may be had to any other neutral or reactive fluid, be it single or compound, that is characterized by its low vaporization heat or its ease of decomposition.

The description which follows with reference to the accompanying non-limitative exemplary drawings will give a clear understanding of how the invention can be carried into practice, such features as emerge either from the description or the drawings naturally falling within the scope of the invention.

Figure 1:
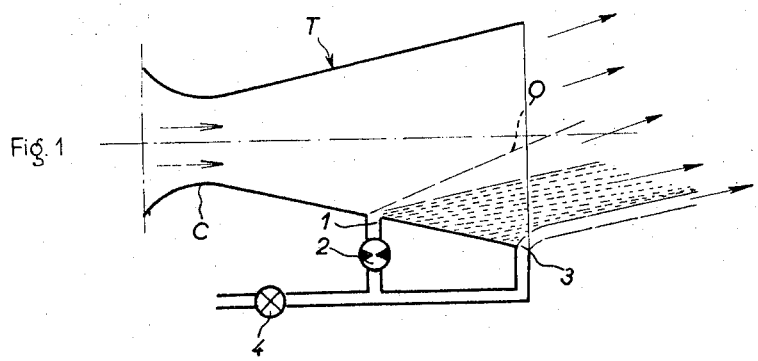
Figure 2:
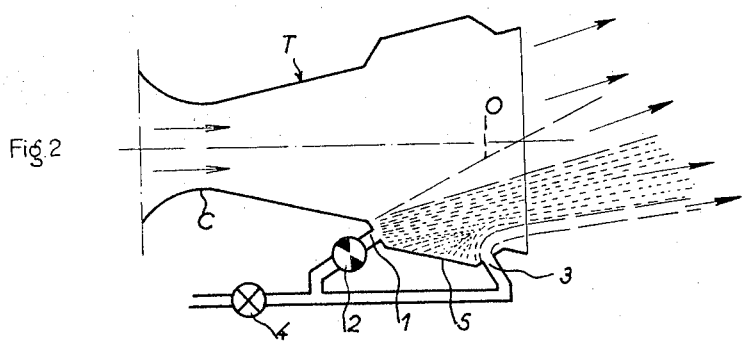
Figure 3:
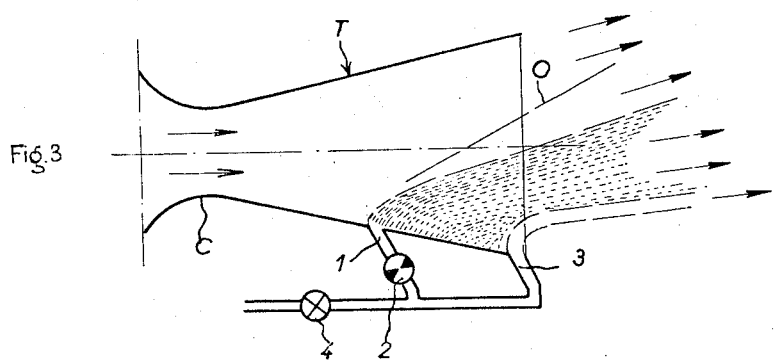
Figure 4:
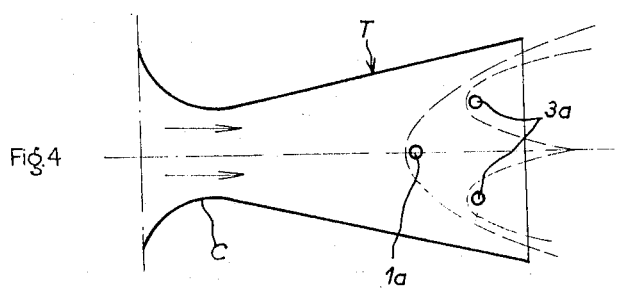

In the drawings:
FIGURES 1, 2 and 3 show in diagrammatic longitudinal section nozzles equipped with the subject deflection device of the invention, in which the liquid injection is effected at a different angle on each figure; and
FIGURE 4 shows in longitudinal section an alternative constructional form.

Reference to the drawings shows a supersonic convergent-divergent nozzle T the throat of which is located at C. Along the wall of the divergent section, downstream of the throat C, at longitudinally spaced levels thereof, are provided two liquid injection holes 1 and 3, the downstream level 3 being located with advantage at the nozzle outlet.

In accordance with the present invention, these two longitudinally spaced injection holes are fed with the same liquid from a common pressure-liquid source (not shown), the downstream injector 3 is supplied directly and hence at relatively high pressure, while the upstream injector 1 is supplied past suitable pressure loss generating means 2 and hence at lower pressure and consequent lower velocity, overall feed control being provided by a valve 4 positioned upstream of the branching point.

Thus the liquid injection at low pressure at the upstream level 1 is vaporized by the heat of the gas flowing through the nozzle T and operates on the boundary layer thereof in the manner well known per se and gives rise to a shock wave schematically represented at O, this effect being enhanced by the slowing down of the boundary layer caused by the liquid injection at the downstream level 3. The liquid injected upstream thus dwells longer in the nozzle and vaporization takes place with greater efficiency.

Manifestly, in order to obtain a selective deflection in different directions, recourse may be had to deflection devices located in different appropriate peripheral positions.

FIGURE 1 shows the injection holes 1 and 3 as being directed across the nozzle axis, but it will of course be understood that this particular orientation is by no means essential.

Thus, by way of example, FIGURE 2 shows an alternative embodiment wherein the upstream injector 1 is inclined into the direction of flow whereas the downstream injector 3 is counter-streamed, both injections being effected from the ends of a small chamber or cavity 5 formed in the wall of the divergent section. This particular constructional form augments the effectiveness of the device due to the thickened boundary layer and consequent possibility of a more complete vaporization of the liquid injected upstream.

In the form of embodiment shown in FIGURE 3, the liquid injections at both levels 1 and 3 are counter-streamed.

Reference is lastly had to the constructional form of FIGURE 4, wherein the liquid is injected through holes 1a and 3a or through similar suitably chosen openings. In this constructional form the sum total of boundary layer augmentations or of primary flow retardations and the sum total of liquid vaporizations are increased by such an arrangement utilizing dual-level injection.

While there has been shown and described, the presently preferred embodiments of the jet deflector device of this invention, it will be well understood by those skilled in the art that various changes and modifications may be made in these embodiments without departing from the spirit and scope of the invention as set forth in the appended claims:

What is claimed is:
1. In combination with a nozzle having a convergent-divergent wall, a jet deflecting device comprising a recessed chamber formed in the divergent section of said wall and extending longitudinally between an upstream end and a downstream end, first liquid injecting means positioned at said upstream end and opening into said nozzle in a direction inclined downstream with respect to the normal to said divergent wall at said upstream end, second liquid injecting means positioned at said downstream end and opening into said nozzle in a direction inclined upstream with respect to the normal to said divergent wall at said downstream end, a common supply of vaporizable liquid under pressure, branched connections between said common supply and both said liquid injecting means, and means positioned in the connection leading to said first liquid injecting means for creating therein a pressure drop relatively to the connection leading to said second liquid injecting means, whereby said second liquid injecting means is supplied with vaporizable liquid at a relatvely high pressure and said first liquid injecting means is supplied with the same liquid at a relatively low pressure.

2. The combination of claim 1, further comprising common valve means in said common pressure-liquid supply ahead of the branching point of said connections.

References Cited by the Examiner

UNITED STATES PATENTS

| | | | |
|---|---|---|---|
| 2,799,990 | 7/1957 | Hausmann | 60—35.55 |
| 3,036,430 | 5/1962 | Eggers et al. | 60—35.54 |
| 3,132,476 | 5/1964 | Conrad | 60—35.54 X |
| 3,133,413 | 5/1964 | Lawrence | 60—35.54 |
| 3,212,259 | 10/1965 | Kepler | 60—35.54 |

OTHER REFERENCES

AIAA Journal, volume 1, No. 3, March 1963. Pages 573–578 relied on.

MARK NEWMAN, *Primary Examiner.*

CARLTON R. CROYLE, *Examiner.*